(12) United States Patent
Lee et al.

(10) Patent No.: US 8,090,668 B2
(45) Date of Patent: Jan. 3, 2012

(54) METHOD FOR PREDICTING CYCLE TIME

(75) Inventors: Yi Feng Lee, Taoyuan County (TW);
Chun Chi Chen, Taipei (TW);
Yun-Zong Tian, Taichung County (TW);
Tsung-Wei Lin, Taoyuan County (TW)

(73) Assignee: Inotera Memories, Inc., Taoyuan County (TW)

( * ) Notice: Subject to any disclaimer, the term of this patent is extended or adjusted under 35 U.S.C. 154(b) by 755 days.

(21) Appl. No.: 12/243,301

(22) Filed: Oct. 1, 2008

(65) Prior Publication Data
US 2009/0327173 A1    Dec. 31, 2009

(30) Foreign Application Priority Data
Jun. 25, 2008    (TW) .................................. 97123720 A

(51) Int. Cl.
*G06F 15/18* (2006.01)
*G06E 1/00* (2006.01)
(52) U.S. Cl. ................................. 706/12; 706/1; 706/21
(58) Field of Classification Search .................... None
See application file for complete search history.

(56) References Cited

U.S. PATENT DOCUMENTS

| | | | |
|---|---|---|---|
| 6,952,656 B1* | 10/2005 | Cordova et al. ............... | 702/117 |
| 7,229,845 B1* | 6/2007 | Luu et al. ........................ | 438/16 |
| 7,707,533 B2* | 4/2010 | McConaghy et al. ......... | 716/119 |
| 2003/0061212 A1* | 3/2003 | Smith et al. ...................... | 707/6 |

OTHER PUBLICATIONS

Chang et al., P., "Evolving CBR and Data Segmentation by SOM for Flow Time Prediction in Semiconductor Manufacturing Factory", pp. 421-429, May 31, 2008.*
Tirkel, I., "Cycle Time Prediction in Wafer Fabrication Line by Applying Data Mining Methods", IEEE, pp. 1-5, 2011.*
Backus et al., P., "Factory Cycle-Time Prediction With a Data-Mining Approach", IEEE Transactions on Semiconductor Manufacturing, vol. 19, No. 2, pp. 252-258, May 2006.*
Chen et al., C., "A Bayesian Model of Cycle Time Prediction", IIE Transactions 33, pp. 921-930, 2001.*
Chen, T., "A Hybrid SOM-BPN Approach to Lot Output Time Prediction in a Wafer Fab", Neural Processing Letters 24, pp. 271-288, 2006.*
Wein, L., "On the Relationship Between Yield and Cycle Time in Semiconductor Wafer Fabrication", IEEE Transactions on Semiconductor Manufactiring, vol. 5, No. 2, pp. 156-158, May 1992.*

(Continued)

*Primary Examiner* — Jeffrey A Gaffin
*Assistant Examiner* — Adrian Kennedy
(74) *Attorney, Agent, or Firm* — Rosenberg, Klein & Lee

(57) ABSTRACT

A method for predicting cycle time comprises the steps of: collecting a plurality of known sets of data; using a clustering method to classify the known sets of data into a plurality of clusters; using a decision tree method to build a classification rule of the clusters; building a prediction model of each cluster; preparing data predicted set of data; using the classification rule to determine that to which clusters the predicted set of data belongs; and using the prediction model of the cluster to estimate the objective cycle time of the predicted set of data. Therefore, engineers can beforehand know the cycle time that one lot of wafers spend in the forward fabrication process, which helps engineers to properly arrange the following fabrication process of the lot of wafer.

19 Claims, 4 Drawing Sheets

OTHER PUBLICATIONS

Kuo et al., C., "Manufacturing Intelligence to Exploit the Value of Production and Tool Data to Reduce Cycle Time", IEEE Transactions on Automation Science and Engineering, vol. 8, No. 1, pp. 103-111, Jan. 2011.*

Chen., T., "A Fuzzy Back Propagation Network for Output Time and Prediction in a Wafer Fab", Applied Soft Computing pp. 211-222, 2003.*

* cited by examiner

```
         ┌─────────┐
         │  START  │
         └────┬────┘
              ▼
   ┌─────────────────────┐
   │ Defining standard value of │
   │ cycle time for reference   │──── S200
   │ fabrication processes      │
   └──────────┬──────────┘
              ▼
   ┌─────────────────────┐
   │ Defining member function │──── S202
   └──────────┬──────────┘
              ▼
         ┌─────────┐
         │   END   │
         └─────────┘
```

FIG. 2

| Fabrication Process Number | Actual Time (in day) | Error Time (in day) | Accuracy (%) |
|---|---|---|---|
| 4 | 5.24 | 0.52 | 91.32 |
| 5 | 6.33 | 0.63 | 90.96 |
| 6 | 6.15 | 0.92 | 86.79 |
| 7 | 6.19 | 0.93 | 93.80 |

FIG. 3

METHOD FOR PREDICTING CYCLE TIME

BACKGROUND OF THE INVENTION

1. Field of the Invention

The present invention is related to a method for predicting cycle time; in particular, to a method of predicting cycle time required for completing a wafer fabrication process.

2. Description of Related Art

In semiconductor manufacturing, each lot of wafers must undergo multiple fabrication processes in order to create the final required semiconductor components. In order to increase operational margins, semiconductor manufacturers have been making every possible effort to reduce the fabrication time required for each lot of wafers, facilitating augmentation of overall yields in semiconductor fabrication plants.

However, many factors influence the time needed for completing the entire semiconductor fabrication process. In addition to the time required for a wafer to undergo each fabrication process, an other essential factor is the time spent by each lot of wafers while waiting for being processed.

The time required for each lot of wafers to complete one fabrication process plus the time spent waiting until reaching the subsequent fabrication process is referred as cycle time. After a specific lot of wafers has undergone the fabrication process, then getting ready to start the next fabrication process, engineers need to determine to which machine tool the lot of wafers is going to be distributed for the next fabrication process. Engineers decide such a distribution of wafers based on their work experience, theoretical knowledge, current load in each machine tool as well as other important factors, with a view to make the queue lots in each machine tool (i.e. number of lots of wafers queuing for entering into the machine tool; for example, the number of lots of wafers in a machine tool is 3, indicating there are three lots of wafers queuing to enter into the machine tool for process) as small as possible.

However, since engineers can not be aware beforehand when the wafers in the forward fabrication process will arrive; that is, the cycle time of the forward fabrication process for a certain lot of wafers is unknown. As a result, engineers may only first wait and expect passively the arrival of the wafers, then start to consider the issue of distribution to which machine tool for the lot of wafers; therefore, appropriate planning in advance for wafer distribution during the fabrication process is very difficult.

Sometimes several lots of wafers may arrive at the same time; in this case, if engineers decide the distribution in haste, uneven distribution may occur, causing many lots of wafers to be collectively distributed to the same machine tool; whereas, suppose engineers over-prudently consider the distribution, many lots of wafers may be delayed and remain in idle. No matter which condition might occur, waiting time for wafer process would be prolonged, thus further affecting the overall yield of the semiconductor factory.

Consequently, if the cycle time of a forward fabrication process can be precisely predicted and appreciated by engineers in advance, it would be helpful for engineers to schedule the following fabrication process beforehand.

Accordingly, the inventors of the present invention have considered the aforementioned disadvantages and proposed the present invention of reasonable design which is able to effectively improve the disadvantages.

SUMMARY OF THE INVENTION

The major objective of the present invention is to provide a method for predicting cycle time, which is capable of predicting cycle time required for a lot of wafers to complete a fabrication process.

To achieve the above-mentioned objective, the present invention provides a method for predicting cycle time, comprising the following steps: collecting a plurality of known sets of data, the known sets of data having at least two reference cycle times and an objective cycle time; using a clustering method to classify the known sets of data into a plurality of clusters; using a decision tree method to build a classification rule of the clusters; building a prediction model of each cluster, the prediction model indicating the relationship of the variation between the reference cycle times and the objective cycle time; preparing data predicted set of data, the predicted set of data having at least two or more known reference cycle times and one unknown objective cycle time; using the classification rule to determine that to which clusters the predicted set of data belongs; and using the prediction model of the cluster to estimate the objective cycle time of the predicted set of data, acquiring a prediction value for the objective cycle time.

The present invention provides the following benefits:

1. The known sets of data are classified into a plurality of clusters by using clustering method, then respectively building the prediction model for each cluster. Since the total number of known sets of data in each cluster is less, time required for building the prediction model is relatively shorter. Besides, the characteristics of the known sets of data in the same cluster are comparatively similar, precision that the prediction model so built can provide is thus higher.

2. The method according to the present invention can precisely predict the cycle time of the objective fabrication process with only two cycle times of known reference fabrication process.

3. The method according to the present invention allows engineers to be aware of the required cycle time for a lot of wafers in the forward fabrication process, facilitating engineers to well arrange the workflow of subsequent fabrication processes for the lot of wafers.

In order to enable further understanding of the features and technical contents of the present invention, references are made to the following Detailed Descriptions and appended Drawings related to the present invention; however, the drawings appended hereunder are simply for the purposes of illustration and description, rather than being used to restrict the present invention thereto.

BRIEF DESCRIPTION OF THE DRAWINGS

FIG. 2 is a flowchart of the method for building a fuzzy system of the method for predicting cycle time according to the present invention.

FIG. 3 shows the practical verification results of the method for predicting cycle time according to the present invention.

DETAILED DESCRIPTION OF PREFERRED EMBODIMENTS

Figure 1:
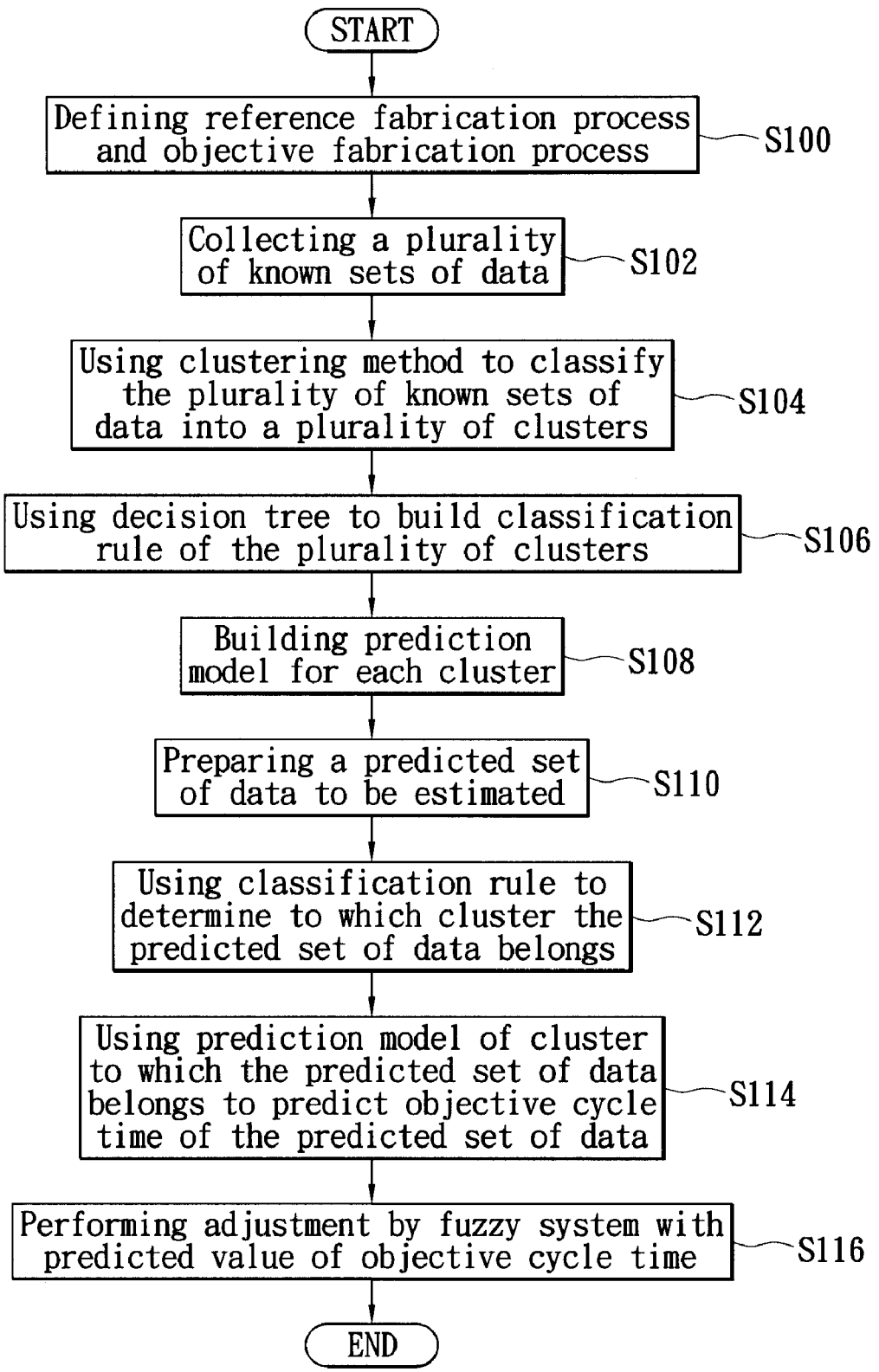
FIG. 1 is a flowchart of a method for predicting cycle time according to the present invention.

Refer now to FIG. 1, wherein a method for predicting cycle time according to the present invention is shown. The depicted method can be employed to forecast the required cycle time for a lot of wafers to complete a step of fabrication process during semiconductor fabrication processes, and detailed workflow thereof is set out as below:

Step S100: initially, engineers consider which cycle time of fabrication process needs to be predicted in the fabrication processes of a specific lot of wafers. To facilitate illustration, the fabrication process which needs to be predicted is referred as objective fabrication process, while the cycle time of the objective fabrication process is referred as objective cycle time. Then several earlier fabrication process before the objective fabrication process are referred as reference fabrication processes, and the cycle times thereof are referred as reference cycle times.

Step S102: afterward, engineers start to collect a plurality of known sets of data, each known set of data provides the actual cycle time of a lot of wafers spent in the objective fabrication process, as well as the actual cycle times of the lot of wafers spent in the reference fabrication processes which are two steps before the objective fabrication process; that is, for each known set of data, there are two known reference cycle times and one known objective cycle time. The more the number of known set of data can be acquired, the more precisely the prediction model later built expresses the actual relationship of variation between the reference cycle time and the objective cycle time.

Step S104: after sufficient collection of known sets of data, it uses next a clustering analysis method to classify the collected known sets of data into a plurality of clusters, every known set of data in the cluster having more similar behaviors. The clustering method adopted in the present invention is known as K-means clustering method, wherein the definition for K value is: classifying the known sets of data into K clusters, and the K value must be smaller than the total number of the known sets of data.

Step S106: then, a classification rule applicable for the clusters is created by means of a decision tree, in which the decision tree creates the classification rule based on the differences between the reference cycle times of the known sets of data. For example, a first reference cycle time of a certain known set of data is shorter than 3 hours, a second reference cycle time thereof is longer than 2 hours, then the known set of data is classified into the first cluster; or else, in case the first reference cycle time is longer than 1 hours and the second reference cycle time is longer than 3 hours, then such a known set of data is classified into the second cluster.

Step S108: subsequently, a prediction model for each cluster is built, in which the prediction model can express the relationship of variation between the reference cycle times and the objective cycle time. Such a prediction model can be built by any applicable mathematical or statistical method; whereas, a more commonly used prediction model is known as polynomial model.

In the present embodiment, it essentially uses a neural network to create the prediction model for each cluster, and also further employs a Back Propagation Neural Network (BPNN) to build the prediction model. These reference cycle times and objective cycle time of the known sets of data can be respectively used as the input layers and the output layer of the neural network, then the neural network performs self-training until the neural network can fully render the relationship of variation between the reference cycle times and the objective cycle time.

Upon the completion of prediction model creation of the clusters, it is now possible to use these acquired prediction models to forecast the objective cycle time of a new lot of wafers, whose detailed steps are illustrated hereunder:

Step S110: since the prediction model created in the above-mentioned step S108 needs two known reference cycle times as inputs to predict the unknown objective cycle time, as a result, the new lot of wafer must need to first accomplish two fabrication processes to obtain these two known reference cycle times.

To differentiate from the name of the aforementioned known set of data, the set of data concerning this new lot of wafers is referred as prediction sets of data, and the prediction set of data has two known reference cycle times and one unknown objective cycle time.

Step S112: the classification rule created in Step S106 can be used to determine to which cluster the prediction set of data belongs, and the classification rule may decide according to the two known reference cycle times of the prediction set of data.

Step S114: next, input the two known reference cycle times of the prediction set of data into the prediction model (neural network) of the cluster to which the prediction set of data belongs, and then the used prediction model predicts the predicted value for the unknown objective cycle time.

At this moment, engineers may schedule the subsequent fabrication process for this new lot of wafers in accordance with the acquired predicted value. In order to make the predicted value more precise and accurate, the method according to the present invention performs a tuning process on the predicted value, in which detailed operations for this tuning are set out as below:

Step S116: it adjusts the predicted value for the objective cycle time by means of a fussy system (fuzzy rule system) so as to obtain a more precise predicted value. Referring now to FIG. 2, wherein the fuzzy system is shown as consisting of the following two steps of creation:

Step S200, initially, standard values of the cycle times for these two reference fabrication processes should be defined, the standard values indicating the cycle times the fabrication processes have under normal condition, and which should be specified by experts and professional in the technical field.

Step S202: a member function is defined for adjusting the predicted value of the objective function, the member function estimating an adjusting value of an objective cycle time based on the variation value between the actual value of the reference cycle time and the standard value. There exist several types of member function, and the present embodiment uses a triangular member function.

After completion of creating the fussy system, it is possible to input the actual values of the two reference cycle times for the objective set of data into the fuzzy system, and the fuzzy system can output the adjusting value for the objective cycle time. Finally, add the adjusting value of the objective cycle time in the predicted value, in order to obtain a more precise predicted value for the objective cycle time.

By means of the above-mentioned method for predicting cycle time according to the present invention, engineers may precisely appreciate the cycle time spent in a certain step of fabrication process for a specific lot of wafers. Refer now to FIG. 3, in which the present invention compares the actual values of cycle times in four fabrication processes for a certain lot of wafers with the predicted values forecasted by the method according to the present invention, thereby identifying that the method according to the present invention indeed provides improved accuracy. From the comparison, it can be seen that the cycle time predicted by the method according to the present invention presents in average 88% of accuracy.

Furthermore, the method according to the present invention is not limited by using two reference cycle times to build the prediction model; it is also possible to utilize more than two reference cycle times to create such a prediction model.

Figure 4:
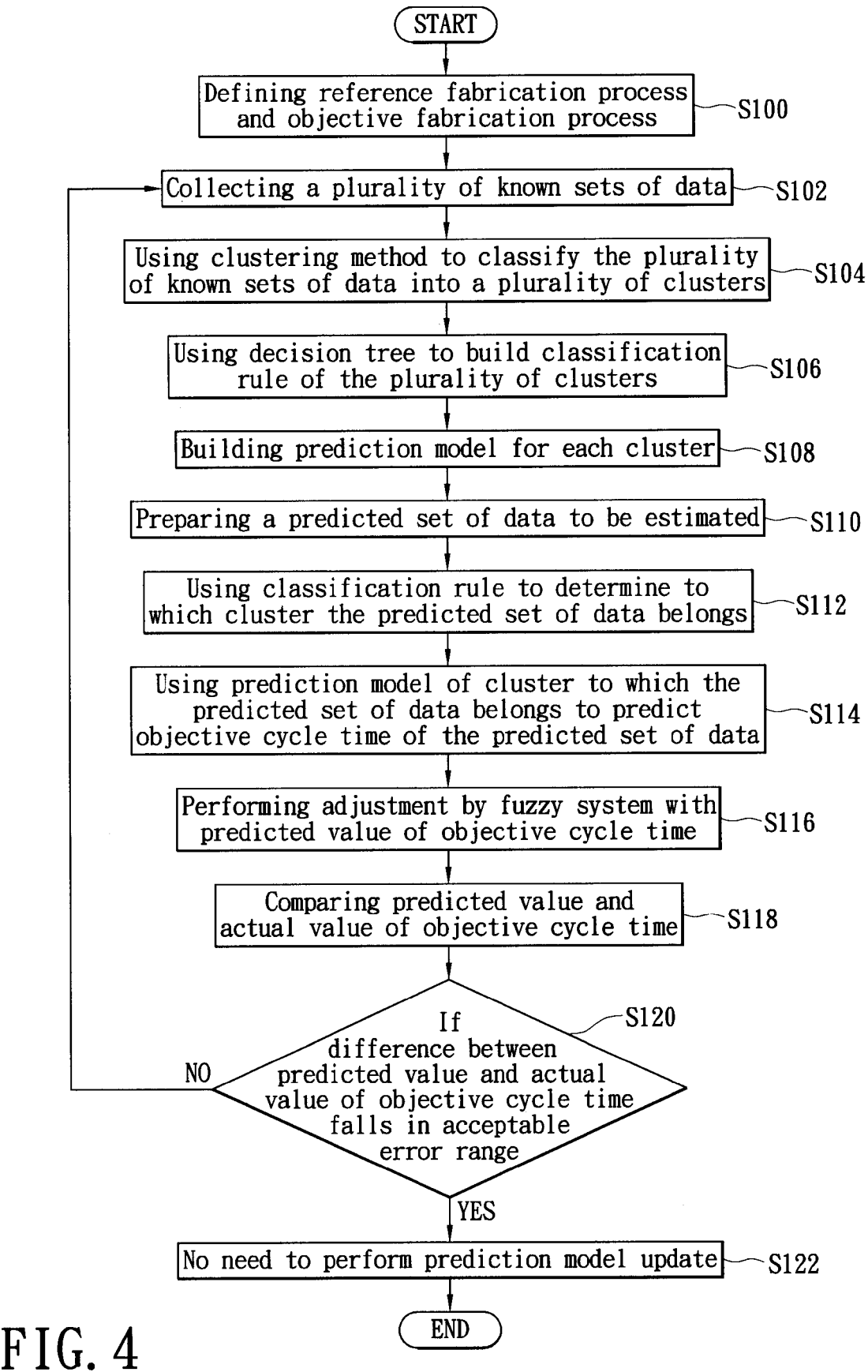
FIG. 4 is a flowchart of a second embodiment of the method for predicting cycle time according to the present invention.

Considering the variation of operational conditions in the machine tool which is likely to change along with the increase of utilization time, existing known sets of data may differ from up-to-now situation in the machine, further resulting in the reduction of precision or accuracy in these prediction models. Therefore, the present invention proposes a second embodiment whose differences with the first embodiment lie in that the method used in the second embodiment consists of a step of prediction model update. Refer now to FIG. 4, wherein the steps for the prediction model update are as below:

Steps S118: after the completion of the current step of objective fabrication process for the new lot of wafer, it obtains an actual value of the objective cycle time, and then compares this actual value with the predicted value derived from the prediction model.

Step S120: if the difference between the predicted value and the actual value becomes greater, thus exceeding an acceptable error range, the process returns to step S102, there newer known sets of data will be collected, building a prediction model which is more likely to match situations in the current machine tool. The acceptable error range can be defined in accordance with the accuracy of the predicted value (referring to FIG. 3); for example, when the accuracy falls below 85%, indicating the prediction model is no longer trustworthy.

Step S122: in case the difference between the predicted value and the actual value stays in this acceptable error range, it means the prediction model needs not to be updated, and the prediction model is still applicable.

Figure 5:
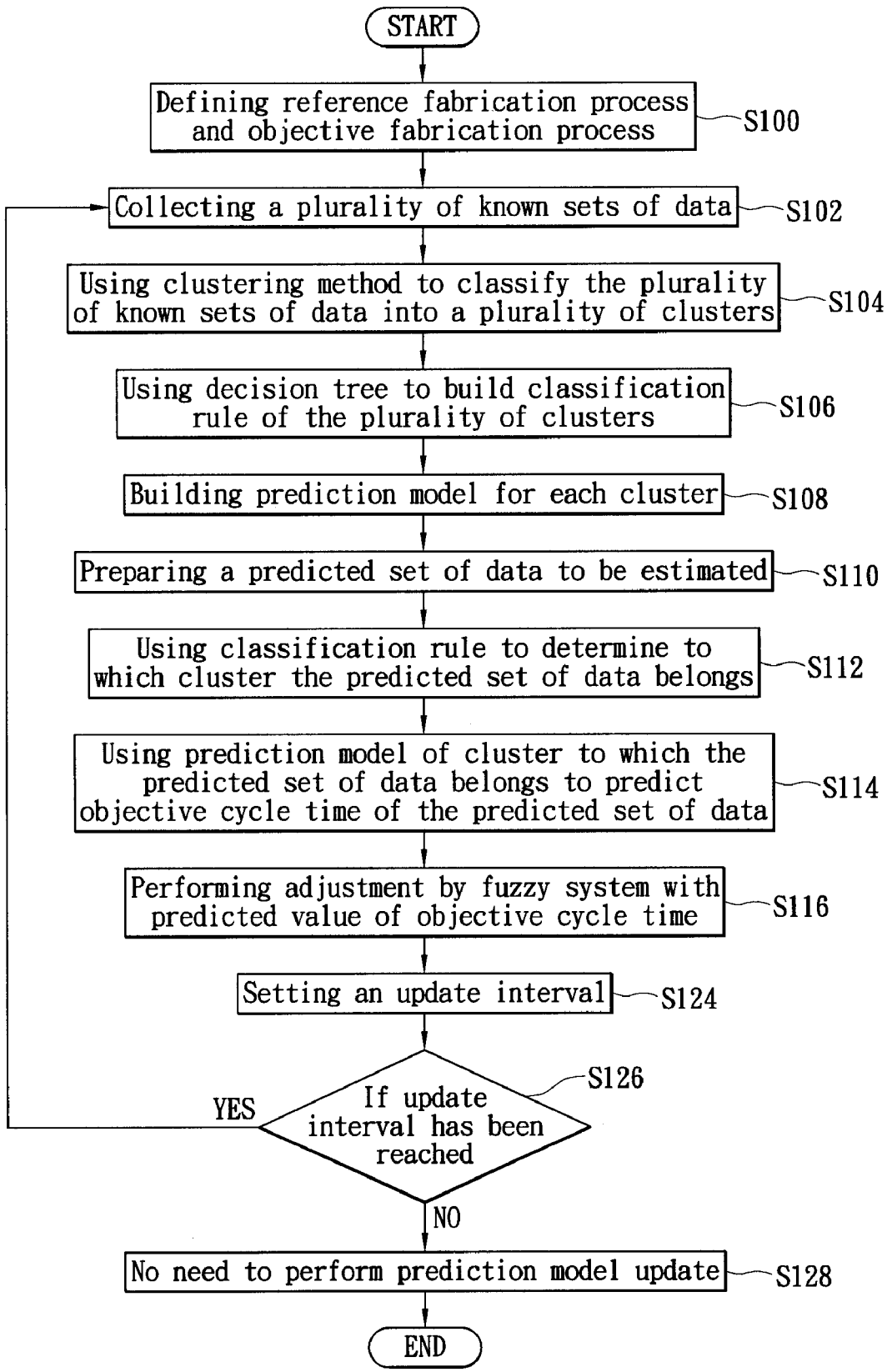
FIG. 5 is a flowchart of a third embodiment of the method for predicting cycle time according to the present invention.

Refer now to FIG. 5, a third embodiment according to the present invention, wherein the steps of another method for prediction model update are illustrated, as below:

Step S124: it sets an update interval, the update interval indicating the frequency in which in time the prediction model needs to be updated; e.g. 7 days.

Step S126: it determines whether the update interval has been reached. In case yes, then the process returns to Step S102, where newer known sets of data will be recollected.

Step S128: suppose the update interval has not been reached yet, then recollection of newer known sets of data will not be executed and existing prediction model will be applied continuously.

Comparing the steps for prediction model update in the third embodiment with the steps shown in the second embodiment, it can be found that the ones in the third embodiment are more convenient to implement, without the need to additionally define an acceptable error range.

In summary, the method according to the present invention provides the following effects:

1. It classifies the know sets of data into a plurality of clusters by means of a clustering method, then respectively builds prediction model for each cluster. Since the number of known sets of data in each cluster is less, the time required for creating such a prediction model can be reduced. Besides, because the characteristics of known sets of data in one cluster are closer, as a result, the cycle time predicted by the prediction model can become more accurate.

2. The method according to the present invention can precisely predict the cycle time of an objective fabrication process simply based on the cycle times of two known reference fabrication processes.

3. The method according to the present invention consists of the step for prediction model update, ensuring good accuracy provided by the prediction model.

4. By using the present method, engineers may appreciate the cycle time that a lot of wafers needs in a forward fabrication process beforehand, further facilitating engineers to well arrange the subsequent fabrication process workflow of the lot of wafers.

Nevertheless, the aforementioned illustrations simply set out the preferred embodiments of the present invention, without any intention to restrict the scope of the present invention to be legally protected thereto. All modifications or changes made equivalently in effect by means of using the present specification and appended drawings thereof should be thus deemed as reasonably encompassed by the asserted scope of the present invention delineated in the subsequent claims.

What is claimed is:

1. A computer implemented predicting cycle time, comprising the following steps:
    collecting a plurality of known sets of data, the known sets of data having at least two reference cycle times and an objective cycle time;
    using a clustering method to classify the known sets of data into a plurality of clusters;
    using a decision tree method to build a classification rule of the clusters;
    building a prediction model of each cluster, the prediction model indicating the relationship of the variation between the reference cycle times and the objective cycle time;
    preparing a predicted set of data, the predicted set of data having of at least two or more known reference cycle times and one unknown objective cycle time;
    using the classification rule to determine that to which clusters the predicted set of data belongs; and
    using the prediction model of the cluster to estimate the objective cycle time of the predicted set of data, acquiring a prediction value for the objective cycle time.

2. The method for predicting cycle time according to claim 1, further comprising the following step:
    using a fuzzy system to adjust the predicted value of the objective cycle time for the predicted set of data.

3. The method for predicting cycle time according to claim 2, wherein the method of building the fuzzy system comprises the following steps:
    respectively defining a standard value for the reference cycle times; and
    defining a member function, which generates an adjusting value of an objective cycle time based on the difference value between the actual value and the standard of the reference cycle times.

4. The method for predicting cycle time according to claim 3, wherein the use of the fuzzy system comprises the following steps:
    calculating the difference values between the actual values and standard values of the reference cycle times of the predicted set of data;
    inputting the difference values into the fuzzy system to obtain an adjusting value for the objective cycle time; and
    adding the predicted value of the objective cycle time to the adjusting value.

5. The method for predicting cycle time according to claim 3, wherein the member function is a triangular member function.

6. The method for predicting cycle time according to claim 3, wherein the standard values for the reference cycle times are defined by experts.

7. The method for predicting cycle time according to claim 1, further comprising the following steps:
    obtaining an actual value of the objective cycle time for the predicted set of data;

comparing the difference between the predicted value and the actual value of the objective cycle time for the predicted set of data; and in case that the difference between the predicted value and the actual value exceeds an acceptable error range, then recollecting the known sets of data.

8. The method for predicting cycle time according to claim 7, further comprising the following step:

in case that the difference between the predicted value and the actual value is within the acceptable error range, then not recollecting the known sets of data.

9. The method for predicting cycle time according to claim 1, further comprising the following steps:

defining an update interval;

determining whether the update interval has been reached; and in case that the update interval has been reached, then recollecting the known sets of data.

10. The method for predicting cycle time according to claim 9, further comprising the following step:

in case that the update interval has not been reached, then not recollecting the known sets of data.

11. The method for predicting cycle time according to claim 1, wherein the clustering method is a K-means clustering method.

12. The method for predicting cycle time according to claim 1, wherein the prediction model is a polynomial model.

13. The method for predicting cycle time according to claim 1, wherein the prediction model is a neural network.

14. The method for predicting cycle time according to claim 13, wherein the neural network is a Back Propagation Neural Network (BPNN).

15. The method for predicting cycle time according to claim 1, wherein the total number of the clusters is smaller than the total number of the known sets of data.

16. A computer implemented predicting cycle time, comprising the following steps:

collecting a plurality of known sets of data, the known sets of data having at least two or more reference cycle times and one objective cycle time;

classifying the know sets of data into a plurality of clusters;

building a classification rule of the clusters;

building a prediction model of each cluster, the prediction model indicating the relationship of the variation between the reference cycle times and the objective cycle time;

preparing a predicted set of data, the predicted set of data having of at least two or more known reference cycle times and one unknown objective cycle time;

using the classification rule to determine that to which clusters the predicted set of data belongs; and using the prediction model of the cluster to estimate the objective cycle time of the predicted set of data, acquiring a prediction value for the objective cycle time.

17. The method for predicting cycle time according to claim 16, further comprising the following step:

adjusting the predicted value of the objective cycle time for the predicted set of data.

18. The method for predicting cycle time according to claim 17, further comprising the following step:

obtaining an actual value of the objective cycle time for the predicted set of data;

comparing the difference between the predicted value and the actual value of the objective cycle time for the predicted set of data; and in case that the difference between the predicted value and the actual value is exceedingly large, then recollecting the known sets of data.

19. The method for predicting cycle time according to claim 17, further comprising the following steps:

defining an update interval;

determining whether the update interval has been reached; and in case that the update interval has been reached, then recollecting the known sets of data.

* * * * *